United States Patent
Lee et al.

(10) Patent No.: US 9,535,739 B2
(45) Date of Patent: *Jan. 3, 2017

(54) VIRTUAL MACHINE STORAGE

(71) Applicant: Tintri Inc., Mountain View, CA (US)

(72) Inventors: Edward K. Lee, Dublin, CA (US); Kieran J. Harty, San Francisco, CA (US); Mark G. Gritter, Eagan, MN (US); Rex R. Walters, Los Gatos, CA (US)

(73) Assignee: Tintri Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,764

(22) Filed: May 20, 2015

(65) Prior Publication Data

US 2016/0011898 A1 Jan. 14, 2016

Related U.S. Application Data

(63) Continuation of application No. 13/094,636, filed on Apr. 26, 2011, now Pat. No. 9,135,033.

(60) Provisional application No. 61/343,385, filed on Apr. 27, 2010.

(51) Int. Cl.
*G06F 9/45* (2006.01)
*G06F 9/455* (2006.01)

(52) U.S. Cl.
CPC .......... *G06F 9/45558* (2013.01); *G06F 9/455* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 6,675,177 | B1* | 1/2004 | Webb | G06F 11/1458 |
| 7,774,391 | B1* | 8/2010 | Le | G06F 17/30091 |
| | | | | 707/822 |
| 2008/0163171 | A1* | 7/2008 | Chess | G06F 9/5077 |
| | | | | 717/120 |
| 2010/0122248 | A1* | 5/2010 | Robinson | G06F 9/485 |
| | | | | 718/1 |

* cited by examiner

*Primary Examiner* — Sisley Kim
(74) *Attorney, Agent, or Firm* — Van Pelt, Yi & James LLP

(57) ABSTRACT

Storing data that includes receiving an indication to perform an operation with respect to data associated with a virtual machine storage abstraction; and using a meta information identifying which data stored on a storage system is associated with the virtual machine storage abstraction to perform the requested operation.

29 Claims, 8 Drawing Sheets

VIRTUAL MACHINE STORAGE

CROSS REFERENCE TO OTHER APPLICATIONS

This application is a continuation of co-pending U.S. patent application Ser. No. 13/094,636, entitled VIRTUAL MACHINE STORAGE filed Apr. 26, 2011 which is incorporated herein by reference for all purposes, which claims priority to U.S. Provisional Patent Application No. 61/343,385 entitled STORING AND MANAGING VIRTUAL MACHINE STORAGE USING VIRTUAL MACHINE ABSTRACTIONS filed Apr. 27, 2010 which is incorporated herein by reference for all purposes.

BACKGROUND OF THE INVENTION

Using virtual machines (VMs) to perform hardware virtualization is becoming increasingly common. Typical storage systems store data as files, file systems, LUNs, and volumes, for example. When a typical storage system is used for storing and running virtual machines (VMs), the administrators who manage the storage systems must create and maintain a mapping between VMs and the typical storage abstractions. Mapping VMs to typical storage abstractions is inefficient in part because each VM generally requires multiple files, file systems, LUNs and/or volumes to store. The difficulty in mapping VMs to typical storage abstractions also makes imposing storage management policies at a desired granularity (e.g., on a per VM basis) inconvenient. Furthermore, typical storage systems also makes viewing statistics at a desired granularity (e.g., on a per VM basis) difficult.

BRIEF DESCRIPTION OF THE DRAWINGS

Various embodiments of the invention are disclosed in the following detailed description and the accompanying drawings.

DETAILED DESCRIPTION

Figure 1:
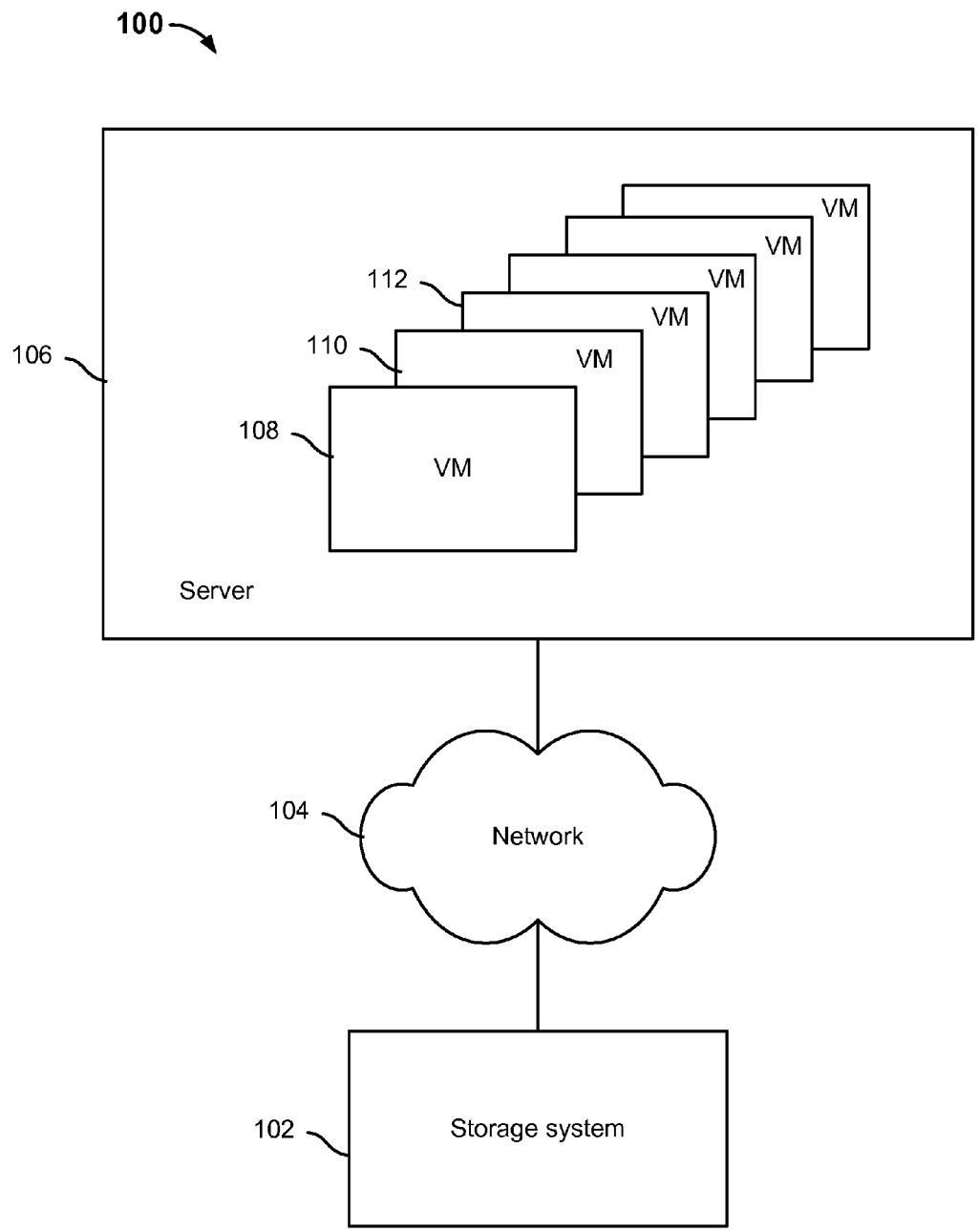
FIG. 1 is a diagram showing an embodiment of a file system for the storage of VMs using virtual machine storage abstractions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Storing and managing the storage of virtual machines using virtual machine storage abstractions is disclosed. In various embodiments, a virtual machine includes one or more files. As used herein, the term "virtual machine storage abstractions" means identifying storage for virtual machines using the identity of the VM or vdisk that is associated with the storage. In some embodiments, meta information mapping to the storage abstractions, such as files, of a specific VM is stored. The storage system detects modifications in the configurations of VMs made by a hypervisor or other entity that manages one or more VMs. In some embodiments, the storage system is configured to determine resource management among the VMs managed by the hypervisor. The storage system updates its mapping to specific VMs when data is transferred to or from the storage system so that the mapping is consistently maintained. In various embodiments, the storage system enables administrators of the storage to perform storage-related operations at various granularities, such as at: specific VMs, vdisks, files or sets of files. The storage system also enables administrators to view statistics at various granularities. In some embodiments, administrators manage the storage system through a user interface.

FIG. 1 is a diagram showing an embodiment of a file system for the storage of VMs using virtual machine storage abstractions. In the example shown, system 100 includes server 106, network 104, and storage system 102. In various embodiments, network 104 includes various high speed data networks and/or telecommunications networks. In some embodiments, storage system 102 communicates with server 106 via network 104. In some embodiments, the file system for the storage of VMs using virtual machine storage abstractions does not include network 104 and storage system 102 is a component of server 106. In some embodiments, server 106 is configured to communicate with more storage systems other than storage system 102.

In various embodiments, server 106 runs several VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to the store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of the one or more vdisks, the state of the VM's BIOS, information and metadata about snapshots by the hypervisor, configuration information of the specific VM, etc. In various embodiments, data associated with a particular VM is stored at a storage system as one or more files. In various embodiments, the files are examples of virtual machine storage abstractions. In some embodiments, the respective files associated with (at least) VMs 108, 110, and 112 running on server 106 are stored at storage system 102.

In some embodiments, a hypervisor (not shown) manages the VMs running on server 106. In some embodiments, the hypervisor is located at server 106. In some embodiments, the hypervisor is located on another server that is in communication with server 106.

A storage system configured to store meta information identifying which stored data objects, such as files or other virtual machine storage abstractions, are associated with which VM or vdisk is disclosed. In various embodiments, storage system 102 stores the data of VMs running on server 106 and also stores the information that provides mapping or other identification of which data objects are associated with which specific VMs. In various embodiments, mapping or identification of specific VMs includes mapping to the files on the storage that are associated with each specific VM. In various embodiments, storage system 102 also stores at least a portion of the files associated with the specific VMs in addition to the mappings to those files. In various embodiments, storage system 106 refers to one or more physical systems and/or associated hardware and/or software components configured to work together to store and manage stored data, such as files or other stored data objects. In some embodiments, a hardware component that is used to (at least in part) implement the storage system may comprise of either disk or flash, or a combination of disk and flash.

In some embodiments, the information that provides mapping or identification is referred to as meta information. Meta information includes attributes and any policies associated with a specific VM. Examples of attributes include a unique identifier of the VM (e.g., a universal unique identifier or UUID), the files or vdisks that comprise the VM, the storage location of each file or vdisk associated with the VM, the type of guest operating system that is being run by the VM, whether the VM is currently active or not, etc. Examples of policies, such as those that relate to storage management, include quality of service (i.e., the difference in prioritization that is given to different applications), performance guarantees, resources quotas, replication and migration policies for the storage corresponding to the specific VM. In some embodiments, some meta information is provided by the administrator (e.g., through the administrator interface) and some are collected and/or updated from the hypervisor or other management entity (e.g., via queries). In some embodiments, all the meta information associated with a specific VM is stored as a set of meta information and identified by the unique identifier of the specific VM (e.g., the set of meta information includes an attribute that is a unique identifier of the specific VM). In some embodiments, meta information for VMs may be stored in data objects instantiated via object-oriented programming, where the set of meta information for a specific VM is a stored as a data object (e.g., the meta information is stored as attributes of the data object). In some embodiments, the meta information is not directly accessible by the administrator. One benefit to storing meta information that maps to specific VMs and their associated files is that storage management may be performed at one or more granularities of VMs, vdisks or the VMs, files or sets of files, which are denoted by the stored meta information.

In some embodiments, storage system 102 includes one or more functional modules. Examples of functional modules include one of more the following: statistics collector, policy manager, snapshotting, resource management, and administrator interface.

In some embodiments, storage system 102 includes communication with a hypervisor that manages the VMs running on server 106. The storage system 102 is configured to detect changes, if any, that are made to the configurations of the VMs via the hypervisor and update its stored meta information accordingly. In some embodiments, storage system 102 is configured to receive network protocol calls regarding the transfer of data either to or from the system. If the network protocols calls affect the VMs for which it stores meta information, then the meta information is updated accordingly. In some embodiments, in response to a network protocol call for a transfer of data, storage system 102 is configured to use the stored meta information to determine how the transfer may be performed optimally with respect to the present storage of files (e.g., based on the meta information, newly written data can be directed to the most appropriate storage tier or stored with different levels of data guarantees). In some embodiments, storage system 102 is configured to receive a request for a storage management related operation with respect to a specific VM and use locally stored meta information to perform the operation with respect to the located files.

In some embodiments, storage system 102 also stores statistical information. Statistical information can be stored on either a per file or per VM basis. Examples of statistics include the rate of read and write access to a particular file or virtual disk, the throughput of a particular virtual machine, the cache hit ratio achieved by the storage system for a particular file or virtual machine, and the amount of storage consumed by a thin-provisioned file or virtual disk. The stored statistical information may be collected, synthesized, and/or presented to an administrator interface of storage system 102.

In some embodiments, storage system 102 is configured to include logic that detects certain events. Examples of events include when storage space at the storage is running low or when a specific VM is utilizing a significant amount of storage space. In some embodiments, when an event is detected, storage system 102 is configured to notify either or both the administrator interface or the hypervisor (e.g., to affect further actions taken with respect to the storage system). For example, in the event that storage system 102 detects that storage space is low at the storage, an indication may be sent to the administrator interface and/or also sent to the hypervisor to warn that no new VMs should be created. For example, in the event that storage system 102 detects that a specific VM is utilizing a significant amount of storage space, an indication may be sent to the hypervisor to advise that the VM should be moved to another storage system.

In some embodiments, storage system 102 is configured to categorize the files stored on it or the VMs for which it stores files into different eviction groups. Each eviction group includes a group of files or VMs that are to be treated similarly for the implementation of a particular policy. For example, different priorities may be given to different eviction groups when implementing a particular policy, such as the one regarding the allocation of different types of storage.

Figure 2:
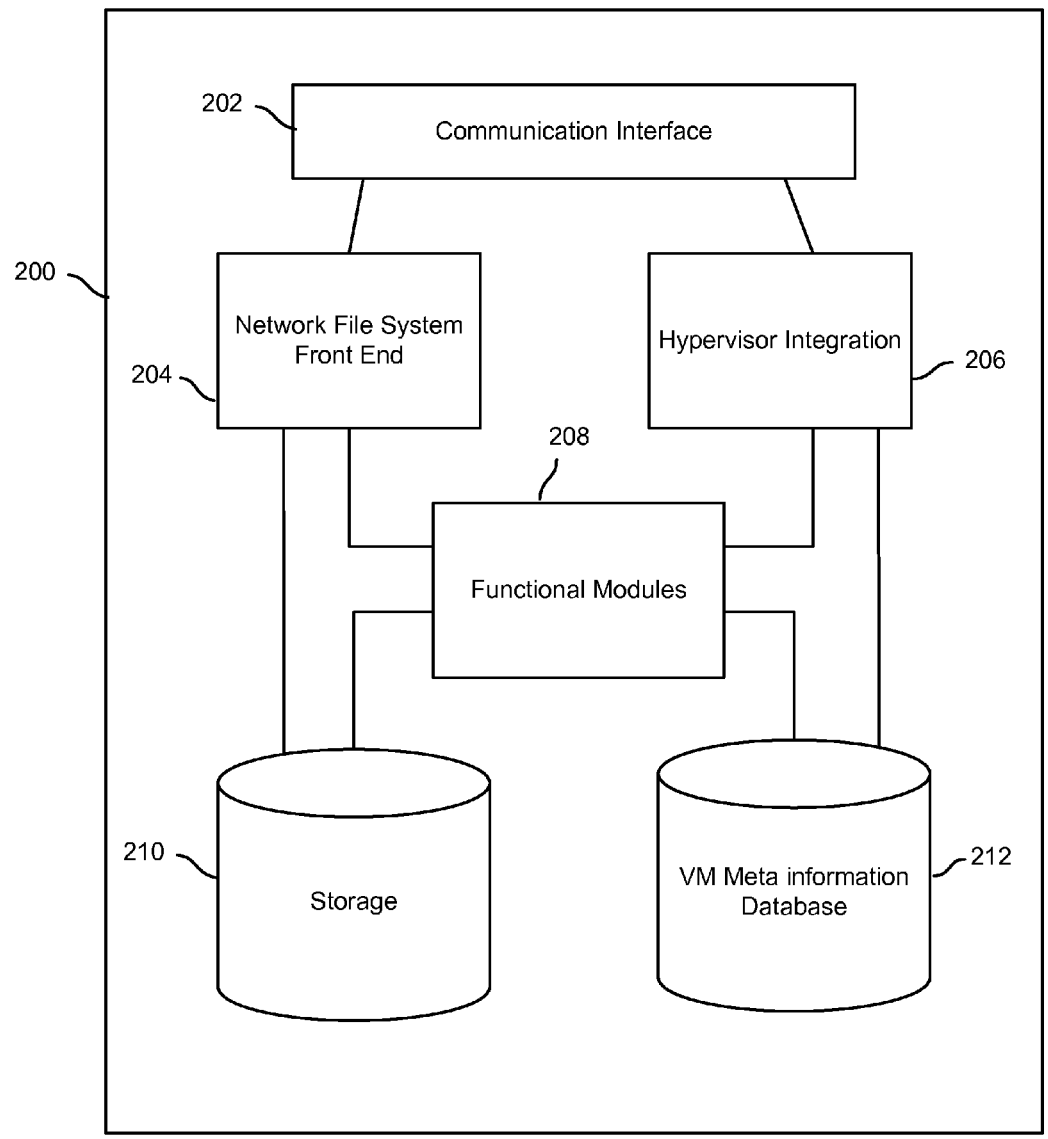
FIG. 2 is a diagram showing an embodiment of a storage system of virtual machines using virtual machine storage abstractions.

FIG. 2 is a diagram showing an embodiment of a storage system of virtual machines using virtual machine storage abstractions. In some embodiments, storage system 102 may be implemented by system 200. In the example shown, system 200 includes communication interface 202, network files system front end 204, hypervisor integration 206, functional modules 208, storage 210, and VM meta information database 212. System 200 may be connected to a network (not shown) to communicate with the host server running one or more VMs. Storage 210 stores the data (e.g., the files) of the one or more VMs. Storage 210 also stores the meta information associated with the one or more VMs. Storage 210 communicates with the host server via communication interface 202 (e.g., a network interface card) and network file system front end 204 via a network protocol. In some embodiments, storage 210 is configured to learn of data transferring to or from the storage via network protocols calls that it receives from the host server. If the transfer of data affects the VMs for which storage 210 stores data and meta information, then the meta information is updated accordingly. A hypervisor (not shown) creates and deletes VMs at the host server and also manages resources among the VMs. Storage 210 is configured to communicate (e.g., over the network and communication interface 202) to the hypervisor through hypervisor integration 206. In some embodiments, hypervisor integration 206 is used to communicate with the hypervisor in order to collect and/or update the meta information stored at storage 210. In some embodiments, VM meta information database 212 also stores at least some of the meta information associated with the VMs running at the server. In some embodiments, storage 210 and VM meta information database 212 store some of the same meta information. In some embodiments, the meta information database 212 is not used in system 200. Functional modules 208 may include statistics collector, snapshotting, resource management, and administrator interface. In some embodiments, the functional modules are configured to communicate with one or more of network file system front end 204, hypervisor integration 206, storage 210 and VM meta information database 212.

In some embodiments, system 200 is configured to receive a request at the administrator interface functional module for a storage management operation with respect to a specific VM for which system 200 stores meta information. Either or both of storage 210 and VM meta information database 212 may be used to identify the relevant underlying files of the specific VM based on the stored meta information for the specific VM. Subsequently, the operation is performed on identified files of the specific VM.

Figure 3:
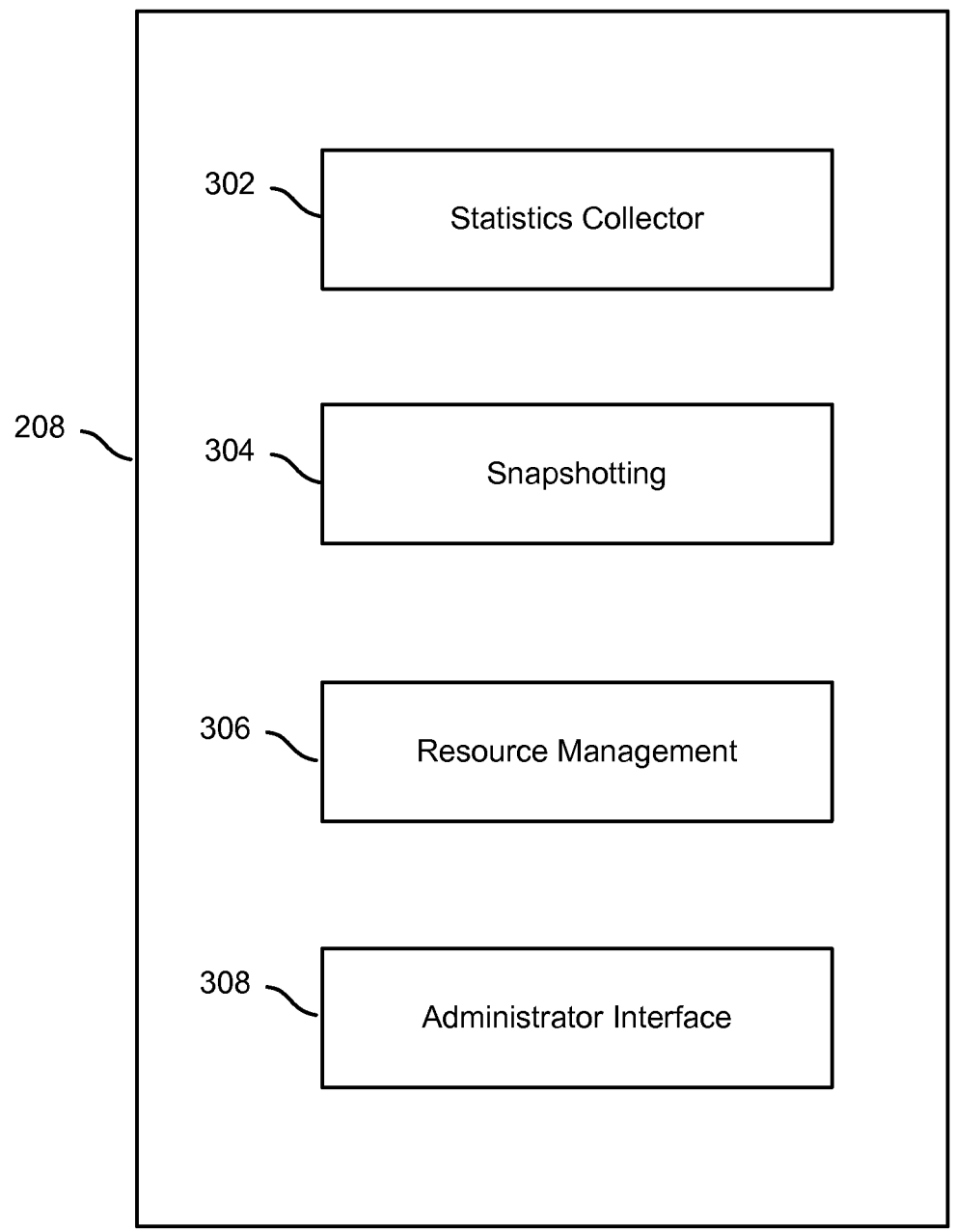
FIG. 3 is a diagram showing an embodiment of functional modules.

FIG. 3 is a diagram showing an embodiment of functional modules. In some embodiments, FIG. 3 may be an example of functional modules 208 of FIG. 2. Functional modules 208 include statistics collector 302, snapshotting 304, resource management 306, and administrator interface 308. Each of modules 302, 304, 306, and 308 may be implemented with physical systems and/or associated hardware and/or software components configured to work together to perform their disclosed function. Using the meta information stored at the storage (e.g., storage 210 and/or VM meta information database 212 of FIG. 2), functional modules 208 permit operations and monitoring to be accomplished on a per specific VM or even on a per file of the specific VM basis, if desired. In some embodiments, statistics collector 302, snapshotting 304, and resource management 306 all communicate with administrator interface 308 to give administrator interface 308 information to be presented to an administrator or manager of the storage system.

Statistics collector module 302 collects statistics stored at the storage. In some embodiments, statistics are stored and/or collected on a VM, per vdisk and/or per file basis. In some embodiments, statistics collector module 302 polls the storage to dynamically synthesize the most current statistics of the VMs and their associated files. Statistics collector module 302 may poll the storage periodically (e.g., every 10 minutes) or upon a request from administrator interface 308. In some embodiments, statistics collector module 302 may also store a history of statistical information collected from the storage.

Snapshotting module 304 creates snapshots for VMs stored at the storage. In some embodiments, snapshotting module 304 is configured to create snapshots on a per VM, per vdisk and/or per file basis using the stored meta information. In some embodiments, snapshotting module 304 is configured to communicate with the hypervisor to either advise the hypervisor regarding its stored meta information or receive information regarding snapshots produced at the hypervisor. In some embodiments, snapshotting module 304 is configured to incorporate the received snapshot information from the hypervisor in creating its own per VM, per vdisk and/or per file snapshots.

Resource management 306 manages the storage resources that are assigned to the VMs and files stored at the storage. In some embodiments, the storage resources include one or both of flash and disk. In some embodiments, resource management 306 is configured to include logic to determine how much of each resource (e.g., flash and/or disk) to assign to one or more specific VMs. In some embodiments, resource management 306 is configured to include logic to detect certain events. As mentioned above, certain events at the storage may indicate when storage space is running low or that a specific VM is utilizing a significant amount of storage space (e.g., relative to the total amount of space available). When an event is detected, resource management 306 is configured to notify either or both the administrator interface or the hypervisor to affect further actions taken with respect to the storage system. For example, in the event that resource management 306 detects that storage space is low at the storage, an indication may be sent to the administrator interface and/or also sent to the hypervisor to warn that no new VMs should be created. For example, in the event that resource management 306 detects that a specific VM is utilizing a significant amount of storage space, an indication may be sent to the hypervisor to advise that the VM should be moved to another storage system.

Administrator interface 308 communicates with an administrator and also with the other functional modules of the storage system. In some embodiments, the administrator of the storage system will request certain information regarding the storage at administrator interface 308. Information requested by the administrator may include statistics at a per VM, per vdisk or per file basis. In some embodiments, the statistics may be collected by statistics collector 302. In some embodiments, administrator interface 308 is configured to present information regarding the occurrence of a certain event (e.g., in response to receiving an indication of such an event). For example, administrator interface 308 may present to an administrator, information regarding the event of low storage space. In some embodiments, administrator interface 308 receives a request (e.g., from the administrator) to perform a storage management operation with respect to a specific VM. Examples of storage management operations include: creation, deletion, taking a snapshot, cloning, reverting to a snapshot, replication, migration, importing the specific VM, adding a vdisk to the specific VM, deleting a vdisk from the specific VM, monitoring, setting a policy for the specific VM, reading or writing to a VM or vdisk, changing the size of a vdisk and reporting. More examples of operations include, such as in anticipation of future access to data, preloading data into a cache or copying or migrating data between different tiers of storage (e.g., into or out of cache). In some embodiments, the storage system will use the meta information of the specific VM to perform or execute the operation.

Figure 4:
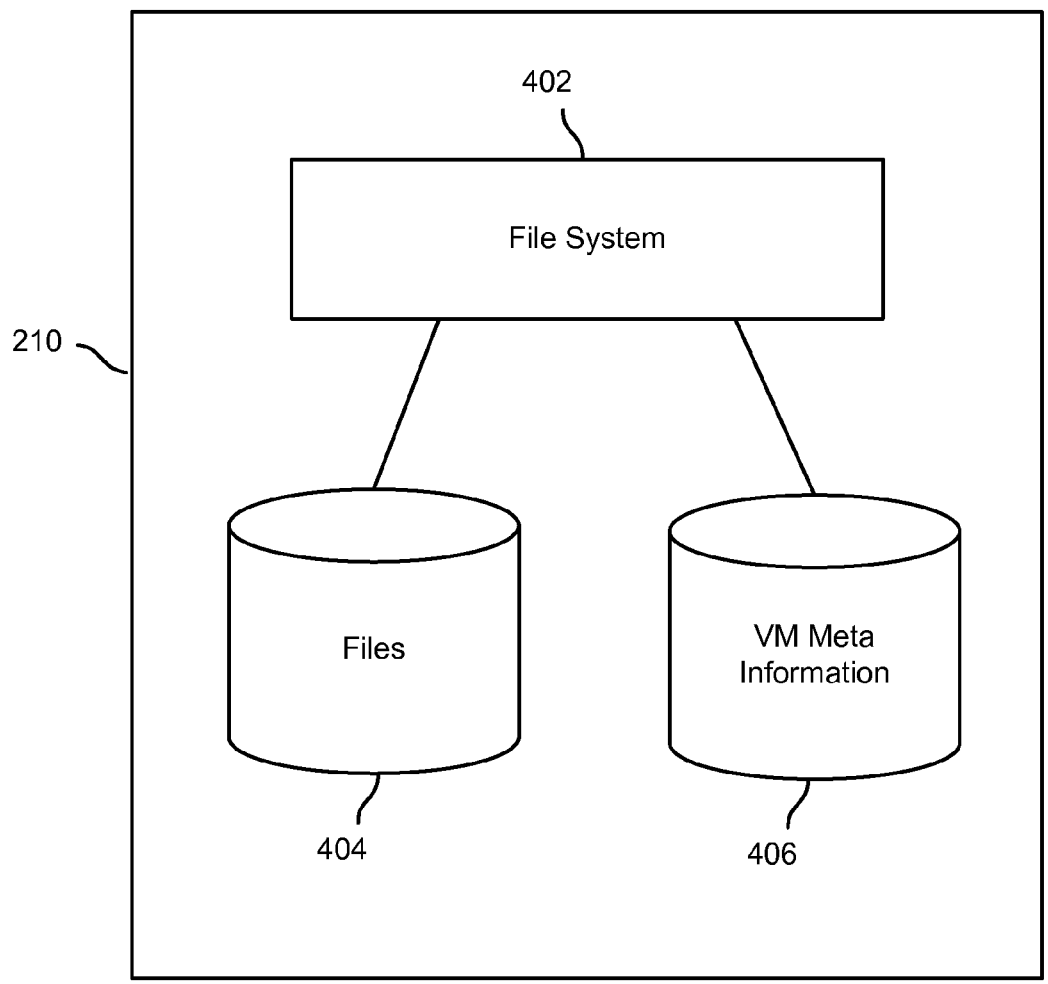
FIG. 4 is a diagram showing an embodiment of a storage.

FIG. 4 is a diagram showing an embodiment of a storage. In the embodiments, FIG. 4 may be an example of storage 210 of FIG. 2. Storage 210 includes file system 402, files 404 and VM meta information 406. In some embodiments, file system 402 communicates to one or more of the following: a server (e.g., over a network), an administrator interface, a hypervisor, functional modules, and a separate VM information database (not VM meta information 406). In some embodiments, files 404 stores the files of the VMs that are associated with and managed by the storage system (e.g., storage system 200 of FIG. 2) of which storage 210 is a component. In some embodiments, VM meta information 406 stores the meta information (e.g., attributes and policies) associated with each of the VMs whose files are stored in files 404.

In some embodiments, file system 402 receives requests to access files stored at files 404 via storage protocols. File system 402 is configured to update the meta information of VM meta information 406 if the requests to access files have affected any of the files stored in files 404 (e.g., new data is written to a file associated with a specific VM). In some embodiments, file system 402 communicates with the hypervisor that manages the VMs whose associated files and meta information are stored at files 404 and VM meta information 406. In some embodiments, file system 402 is configured to communicate with the hypervisor to receive information regarding which files are associated with which VMs and what other attributes and policies are associated with each VM. File system 402 is configured to store such information as VM meta information in 406. In some embodiments, meta information pertaining to a single VM is stored as a set and identified by the unique identifier of the VM. In some embodiments, file system 402 is configured to detect any changes in the management of the VMs (e.g., whether a new VM has been created or deleted, whether a VM has been migrated, etc). File system 402 is configured to accordingly update meta information stored in VM meta information 406 based on the detected changes.

In some embodiments, file system 402 is configured to receive a request to perform a storage management operation with respect to a specific VM that is associated with storage 210. Using the meta information stored in VM meta information 406 that is associated with the specific VM, the specific files of files 404 that are associated with the specific VM may be identified so that the requested operation may be performed with respect to the relevant files of the specific VM. For example, when a VM associated with storage 210 is to be replicated or migrated to another storage similar to storage 210, their associated files from 404 are identified using the meta information of meta information 406 that are associated with the VM. These identified files of 404 may then be replicated and migrated to the other storage and the accompanying meta information of the VM may also be replicated and migrated to the other storage. As another example, when a VM is snapshot, cloned, replicated, migrated, backed up, or restored, storage 210 created a copy or a new instance of the specified VM and also records the relationship between the original VM and the derived one or more copies or new instance(s) of the specified VM. The copies and new instances may inherit or preserve some or all the meta information associated with the original VM. In some embodiments, the copies or new instances may disable, redefine or add to the inherited attributes.

Figure 5:
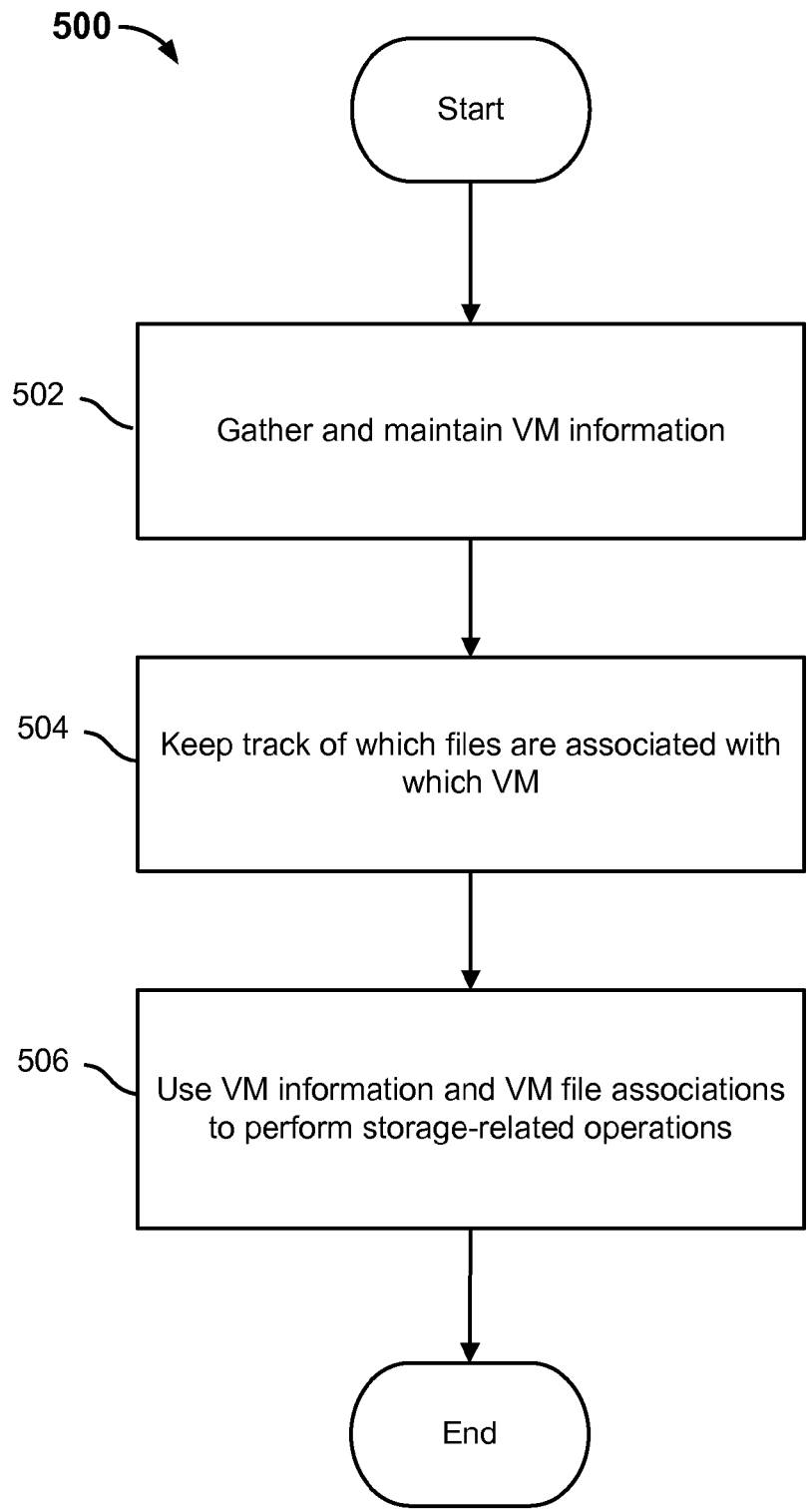
FIG. 5 is a flow diagram showing an embodiment of using a storage of VM abstractions.

FIG. 5 is a flow diagram showing an embodiment of using a storage of VM abstractions. At step 502, VM information is gathered and maintained. In some embodiments, VM information is gathered from one or both of the following: the hypervisor that manages the VMs associated with the storage or the administrator that manages the storage. In some embodiments, the gathered information includes attributes (e.g., the name of each VM, which files or vdisks are associated with each VM, the location of each file or vdisk, and the guest operating system running on each VM) and policy settings (e.g., quality of service, guarantees, resource quotas, and replication) associated with each VM or vdisk. In various embodiments, the gathered VM information is stored as meta information. In some embodiments, changes at the hypervisor are detected and the stored meta information is updated when appropriate.

At step 504, which files are associated with which VM are kept track of. In some embodiments, storage protocols are used to access the storage (e.g., transfer data to or from the storage). Examples of storage protocols include NFS, CIFS and iSCSI. Calls to the storage may include write functions that add or modify data in the stored files. In some embodiments, in the event that files stored and maintained by the storage are modified, the meta information of the associated VM is also updated.

At step 506, VM information and VM file associations are used to perform storage-related operations. In some embodiments, the storage receives a storage management operation (e.g., creation, deletion, taking a snapshot, taking a snapshot . . . etc) with respect to a specific VM or vdisk or file associated with a specific VM. In some embodiments, the stored meta information includes attribute and policy information regarding each specific VM and their associated files or vdisks. The stored meta information is used to identify the specific VM and those of its files stored in storage that are relevant to the requested operation. For example, for an operation to replicate a VM, all the files that comprise that VM is identified using stored meta information and then the identified files can be replicated.

Figure 6:
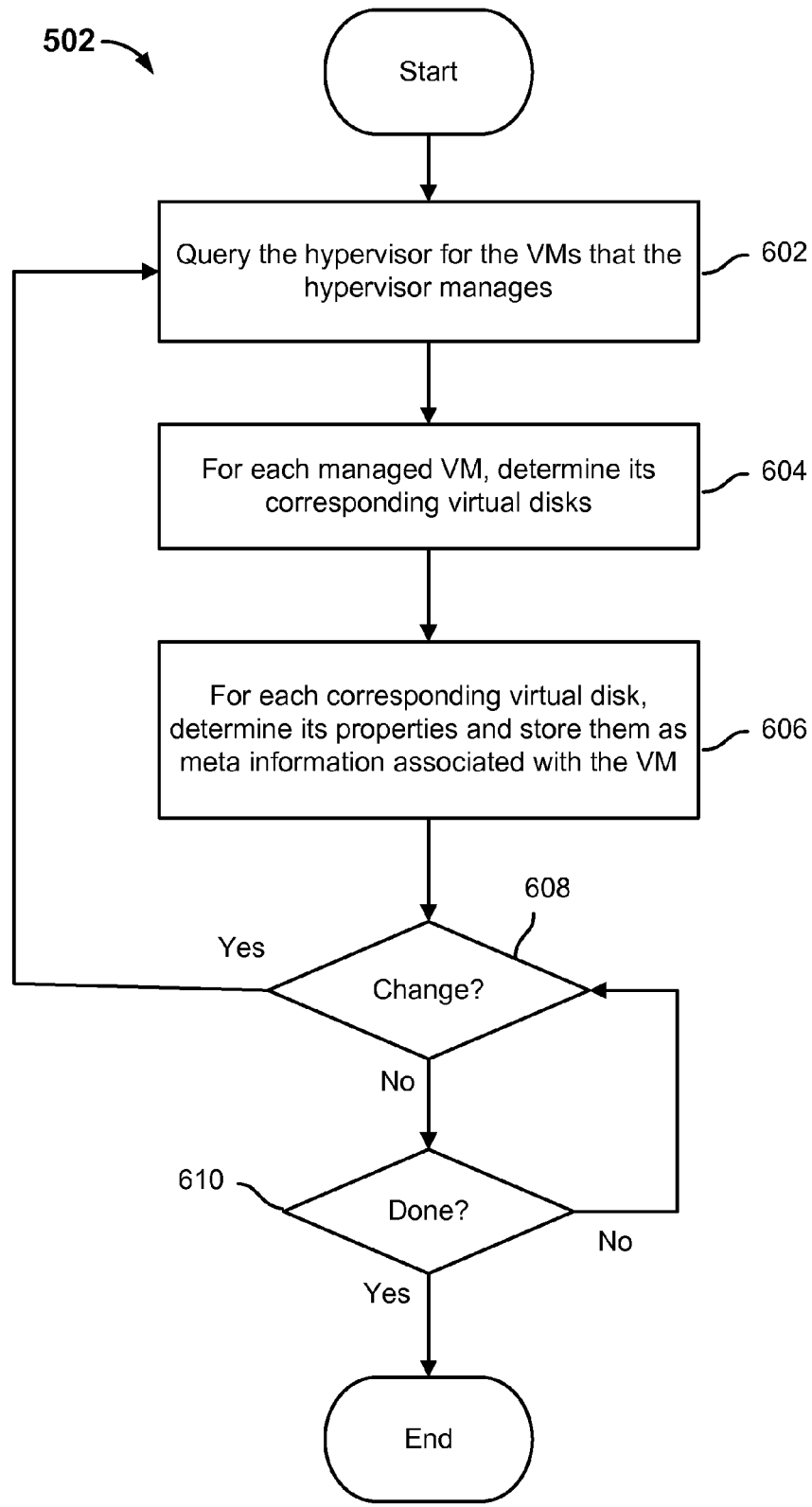
FIG. 6 is a flow diagram of a process for gathering and maintaining VM information for a storage of VM abstractions.

FIG. 6 is a flow diagram of a process for gathering and maintaining VM information for a storage of VM abstractions. In some embodiments, FIG. 6 is an example of step 502 of the process of FIG. 5. One benefit of gathering and maintaining the VM information is to preserve consistency between the configuration of the VMs and the meta information associated with the VMs stored on the storage system. For example, the storage system monitors the management of the VMs by the hypervisor and updates the meta information to ensure it is consistent with the current state of the data representing a VM. At step 602, a hypervisor is queried for the VMs that are managed by the hypervisor. An example of a hypervisor is VMware. In some embodiments, the hypervisor is queried by communicating with the application programming interface (API) of the hypervisor. For example, for the hypervisor VMware, the vCenter component includes an API that may be queried to obtain information regarding the VMs that are managed by the hypervisor.

At step 604, for each VM managed by the hypervisor, its corresponding virtual disk (i.e., vdisk) is determined. As mentioned above, each VM stores its data on one or more vdisks. In some embodiments, because the hypervisor creates the one or more files that store the content for each vdisk of a VM, it may be queried to determine which vdisks correspond to each managed VM and which files store the content of the vdisks. At step 606, for each corresponding vdisk, its properties are determined and stored as meta information associated with the VM. In various embodiments, properties include attributes and policy settings. In some embodiments, the properties of each corresponding vdisk may also be determined via querying the hypervisor. At decision step 608, a change at the hypervisor is detected. Examples of a change at a hypervisor, for example, include: creation of a new VM, deletion of a VM, creating of a vdisk for a VM, deleting of a vdisk for a VM, suspension of a VM, cloning of a VM, or migration of a VM. Detecting a change at the hypervisor may be accomplished by one or more of the following: periodically querying the API (e.g., querying VMware's vCenter), subscribing to messages sent out by the hypervisor (e.g., subscribing to messages sent out by vCenter), listening to the hypervisor (e.g., detecting when any activity is occurring at the vCenter), detecting a deletion of a file known to be managed by the hypervisor, detecting that the hypervisor is about to create a new file, or polling the hypervisor. If a change is detected at decision step 608, then the process begins at step 602 once more. At decision step 610, the process no longer repeats from step 602 when it is done (e.g., when the storage system is turned off).

Figure 7:
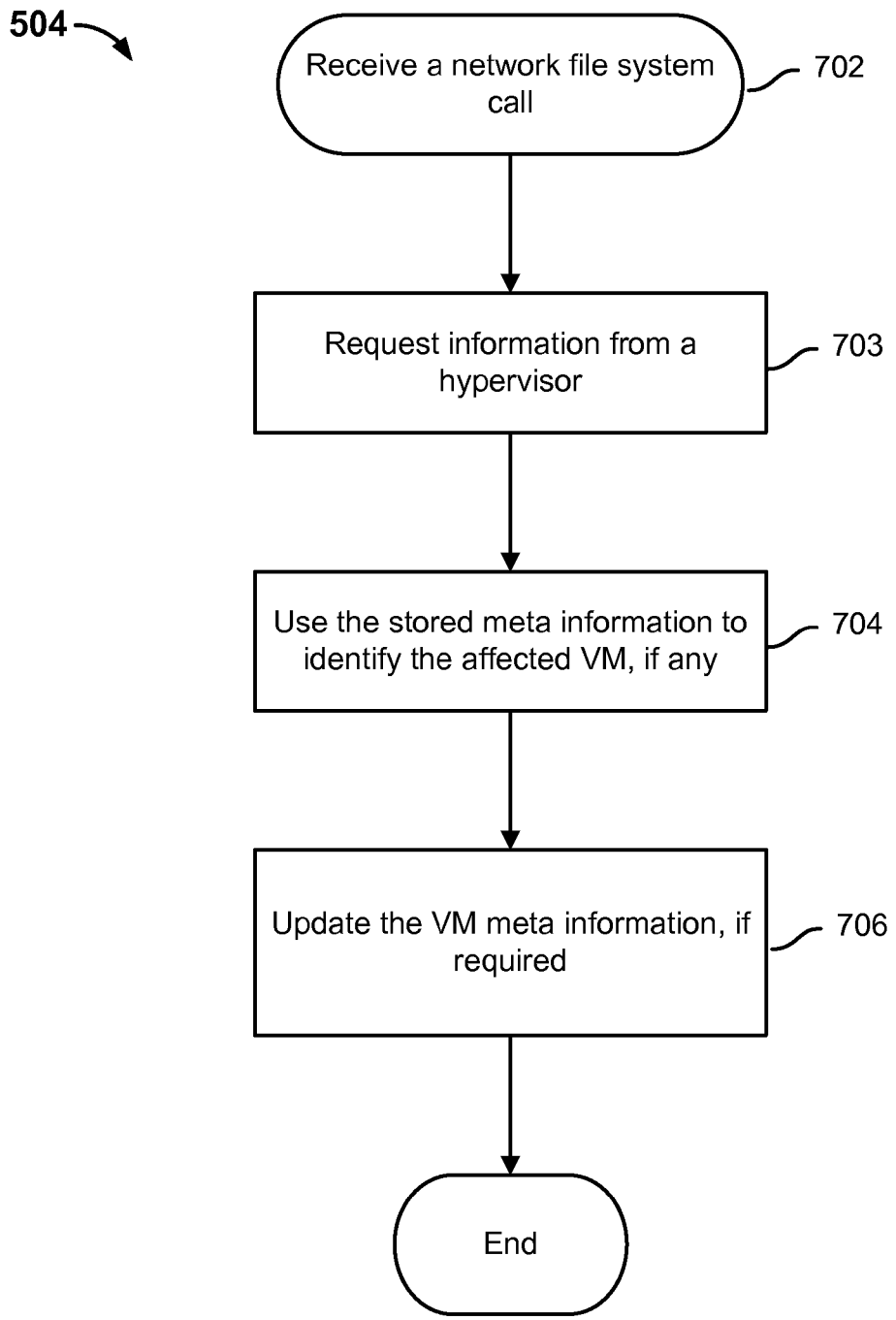
FIG. 7 is a flow diagram showing an embodiment of keeping track of which files are associated with which VM.

FIG. 7 is a flow diagram showing an embodiment of keeping track of which files are associated with which VM. In some embodiments, FIG. 7 is an example of step 504 of the process of FIG. 5. In some embodiments, when modifications are made to the files of the VMs through network system calls (e.g., a call to a write function of a vdisk), the storage system updates the mapping or identification (e.g., the associated meta information) of the VMs to be consistent with the modifications to the underlying data of the VMs. The modifications to the files (e.g., of the affected vdisk of the specific VM) at the storage system are then reflected in the stored mapping (e.g., by updating the meta information for mapping to the files associated with specific VM). At step 702, a call from the network file system is received. In various embodiments, the call is a function that pertains to accessing data (e.g., transferring data to or from) the storage system. For example, for a network file system call to a write on a vdisk of a specific VM, the storage system is notified (e.g., by a front end interface) through a network protocol. In some embodiments, the network protocol may include one or more of the following: Network File System (NFS), Internet Small Computer System Interface (iSCI), Common Internet File System (CIFS), or any appropriate network protocol.

At step 703, information is requested from a hypervisor. In some embodiments, step 703 is optionally performed. Information requested from the hypervisor includes any new information (e.g., a recent creation of a file by the hypervisor) or updated information (e.g., a recent deletion of a file by the hypervisor). In some embodiments, the meta information may be updated in accordance with the requested information from the hypervisor. In some embodiments, the execution or result of the network file system call may be modified based on the updated meta information. For example, based on the updated meta information, the storage system may refuse to create a file (e.g., as requested in the network file system call) that is not associated with any VM that is managed by the storage system. Or in another example, based on the updated meta information, the storage system may notify the hypervisor to not allow a VM to be powered on if there is insufficient storage space at the storage system.

At step 704, the stored meta information is used to identify the affected VM, if there is any. In various embodiments, the specific VM to be affected by the network file system call is identified using the stored meta information, which includes VM attribute information (e.g., unique identifiers for each VM in the storage). For example, the affected VM may be indicated by an identifier contained in the network file system call and that identifier may be compared with the unique VM identifier attribute of each set of stored meta information for each specific VM to find a match. At step 706, the meta information of the VM is updated, if required. Once the affected VM of the storage is identified based on the unique VM identifier attribute of the stored meta information, then the other attributes (e.g., which files are associated with the VM, where the files are stored) and policies of the identified VM may also be identified in the matched set of meta information and updated if appropriate. For example, a network file system call to write to a vdisk of a specific VM may entail an update to the set of meta information associated with the specific VM if writing data to the vdisk causes another file to be created. The meta information associated with the affected VM may be updated to reflect that a new file (e.g., a file created at location X) has been added to the files that are associated with the affected VM. However, if the network file system call were to read a file at the storage and no modification of data occurs, then the meta information of the identified VM may not need to be updated.

Figure 8:
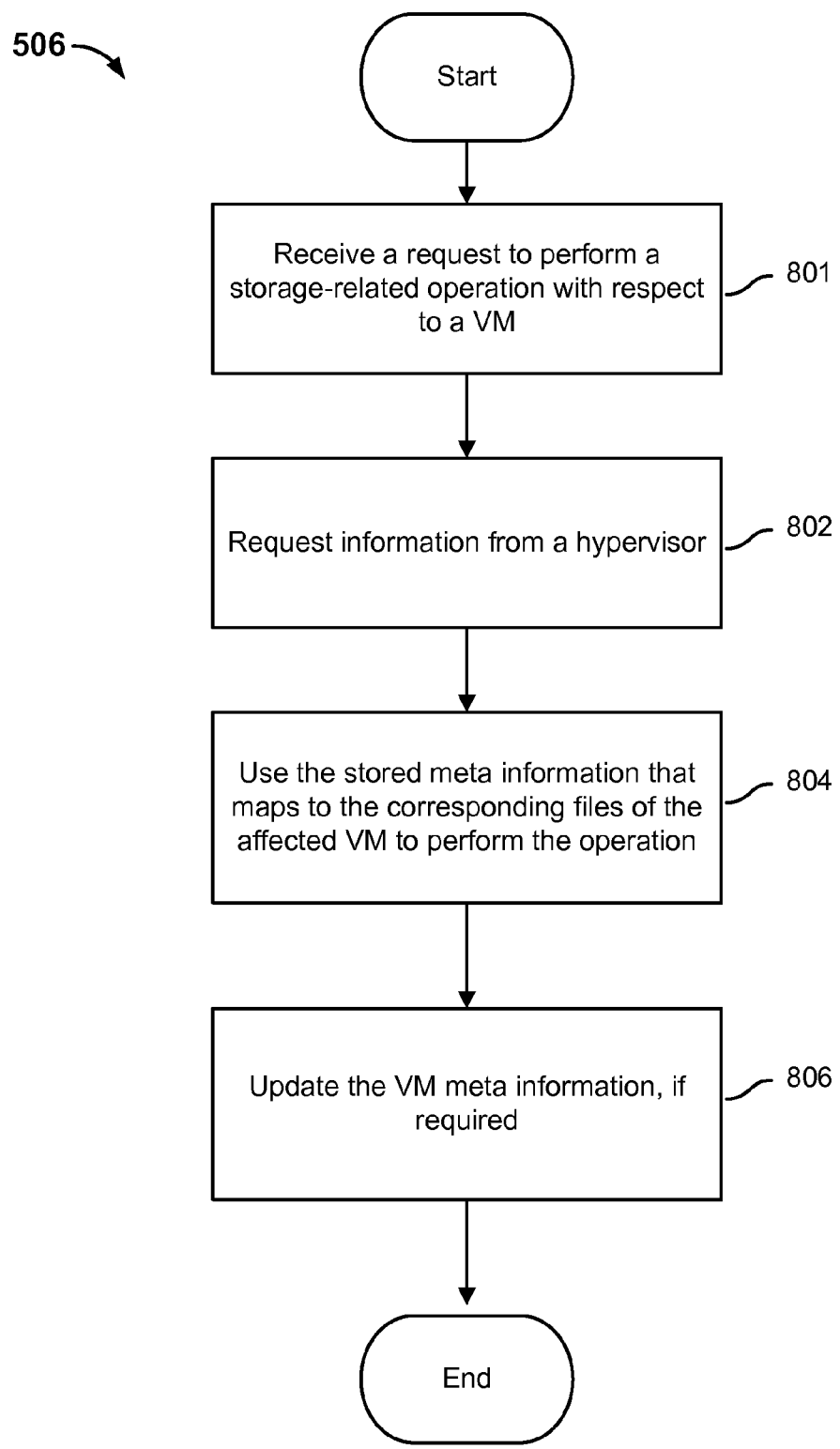
FIG. 8 is a flow diagram showing an embodiment of using VM information and VM file associations to perform storage-related operations.

FIG. 8 is a flow diagram showing an embodiment of using VM information and VM file associations to perform storage-related operations. In some embodiments, FIG. 8 is an example of step 506 of FIG. 5. Administrators of the storage system may desire to execute operations at one or more of granularities such as: specific VMs, vdisks, files or sets of files. Using the VM information and VM file associations (e.g., stored as meta information) stored at the storage system, the appropriate VM or vdisks or files or sets of files can be identified (e.g., based on the stored meta information that maps a to a specific VM and to the files that store the contents of its vdisks and its other data) so that the operation may be performed at the desired granularity of data. For example, an administrator may desire to set a certain quality of service policy for a particular vdisk of a specific VM. The administrator may input the request to perform the setting of this policy for the vdisk of the specific VM at the administrator interface. The set of meta information including the attributes (e.g., which files are associated with the VM, where the files are stored, which files store the contents of which vdisks) and policies of the specific VM are identified. Then, the vdisk or the set of the files that store the contents of that vdisk for which the policy is to be set may be identified using the set of meta information.

At step 801, a request to perform a storage-related operation with respect to a VM is received. As mentioned before, storage-relation operations may include creation, deletion, taking a snapshot, cloning, reverting to a snapshot, replication, migration, importing a VM, adding a vdisk to a VM, deleting a vdisk from a VM, monitoring, setting a policy for a VM/vdisk/files/or set of files, reading or writing to a VM or vdisk, changing the size of a vdisk and reporting. In some embodiments, the request to perform a storage-related operation may be received from the administrator interface.

At step 802, information is requested from a hypervisor. In some embodiments, step 802 is optionally performed. Information requested from the hypervisor includes any new information or updated information. In some embodiments, the meta information may be updated in accordance with the requested information from the hypervisor. In some embodiments, the execution or result of the storage-related operation may be modified based on the updated meta information. In some embodiments, storage system may delay or refuse the execution of requested storage system operations to ensure consistency of the data and meta information. In some embodiments, in the event the hypervisor cannot be accessed for up-to-date meta information, the requested management operation can be refused or the meta information will be marked as out-of-date.

At step 804, the stored meta information that maps to the corresponding files of the affected VM is used to perform the operation. In some embodiments, the request includes an identifier of the affected VM. The VM identifier in the request may then be used to compare against the unique VM identifier attribute of each set of stored meta information for each specific VM to find a match. Once the set of meta information for the affected VM is identified, then the other attributes and policies of the identified VM may also be identified in the matched set of meta information. Based on the set of meta information of the affected VM, the appropriate granularity of data (e.g., all the files of the VM, certain files storing vdisk content, certain sets of files) may be identified. The operation may then be performed on the identified granularity of data. In some embodiments, the data is stored locally at the storage system.

At step 806, the VM meta information is updated, if required. In some embodiments, the meta information may be updated for the performance or as a result of the requested operation (e.g., setting a policy associated with a VM may require storing a new policy setting with the meta information of the VM or deleting a file from the storage system may require deleting the meta information associated the deleted file with a vdisk or virtual machine).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a storage system; and
a processor coupled to the storage system and configured to:
receive an indication to perform an operation with respect to data associated with a specified granularity of storage associated with a virtual machine;
identify within a plurality of stored sets of meta information a stored set of meta information associated with the virtual machine, wherein the identified stored set of meta information associated with the virtual machine is maintained based at least in part on periodically querying a hypervisor, and wherein the identified stored set of meta information associated with the virtual machine indicates a type of guest operating system that is being run by the virtual machine, wherein the identified stored set of meta information associated with the virtual machine comprises statistical information associated with the virtual machine that includes at least one of a throughput and a cache hit ratio of the virtual machine;
identify the data associated with the specified granularity of storage associated with the virtual machine using the identified stored set of meta information;
perform the operation with respect to at least a portion of the identified data associated with the specified granularity of storage associated with the virtual machine; and
determine whether to update the identified stored set of meta information based at least in part on a result associated with the performed operation.

2. The system of claim 1, wherein the specified granularity of storage associated with the virtual machine includes one or more of the following: the virtual machine, a virtual disk associated with the virtual machine, a file associated with the virtual machine, a set of files associated with the virtual machine, a data object associated with the virtual machine, or a set of data objects associated with the virtual machine.

3. The system of claim 1, wherein the identified stored set of meta information comprises mappings to one or more storage locations at which files associated with the virtual machine are stored.

4. The system of claim 3, wherein to identify the data associated with the specified granularity of storage associated with the virtual machine using the identified stored set of meta information comprises: to use the mappings to the one or more storage locations at which files associated with the virtual machine are stored to identify storage locations of one or more files associated with the specified granularity of storage associated with the virtual machine.

5. The system of claim 1, wherein the operation comprises a creation or deletion operation with respect to the specified granularity of storage associated with the virtual machine.

6. The system of claim 1, wherein the operation comprises one or more of the following: taking a snapshot, cloning, reverting to a snapshot, replication, migration, and importing with respect to the specified granularity of storage associated with the virtual machine.

7. The system of claim 1, wherein the operation comprises adding a virtual disk or deleting a virtual disk with respect to the specified granularity of storage associated with the virtual machine.

8. The system of claim 1, wherein the operation comprises monitoring or reporting with respect to the specified granularity of storage associated with the virtual machine.

9. The system of claim 1, wherein the operation comprises reading or writing with respect to the specified granularity of storage associated with the virtual machine.

10. The system of claim 1, wherein the identified stored set of meta information comprises one or more policy settings associated with the virtual machine, wherein the one or more policy settings associated with the virtual machine comprise settings for one or more of the following: quality of service, resource quotas, replication, migration, reading data, and writing data.

11. The system of claim 1, wherein the processor is further configured to:
   detect a change made with respect to a configuration associated with the virtual machine; and
   update the identified stored set of meta information based at least in part on the detected change.

12. The system of claim 11, wherein to detect the change with respect to the configuration associated with the virtual machine comprises one or more of the following: to periodically query the hypervisor, to subscribe to messages sent out by the hypervisor, to listen to the hypervisor, to detect file creation, to detect deletion or other activity at the hypervisor, and to poll the hypervisor.

13. The system of claim 1, wherein the processor is further configured to request additional or updated information from the hypervisor in response to receiving the indication to perform the operation.

14. The system of claim 13, wherein the processor is further configured to update the identified stored set of meta information based at least in part on the requested additional or updated information received from the hypervisor.

15. The system of claim 13, wherein the processor is further configured to modify an execution of the operation or a result of the operation based at least in part on the requested additional or updated information received from the hypervisor.

16. The system of claim 1, wherein the identified stored set of meta information comprises one or more attributes associated with the virtual machine, wherein the one or more attributes associated with the virtual machine include one or more of the following: what data is associated with the virtual machine, what data is associated with which virtual disk associated with the virtual machine, a unique virtual machine identifier associated with the virtual machine, a storage location of each virtual disk associated with the virtual machine, and whether the virtual machine is currently active.

17. The system of claim 1, wherein the processor is further configured to:
   receive a request to transfer a data with respect to the storage system;
   determine which virtual machine is associated with the request; and
   update any meta information associated with the virtual machine that is associated with the request.

18. The system of claim 1, wherein the identified stored set of meta information associated with the virtual machine comprises a quality of service policy setting associated with one or more applications.

19. The system of claim 1, wherein the statistical information associated with the virtual machine comprises one or more of: a rate of read and write access associated with a file associated with the virtual machine, a rate of read and write access associated with a virtual disk associated with the virtual machine, a cache hit ratio achieved by the storage system for the file associated with the virtual machine, a cache hit ratio achieved by the storage system for the virtual disk associated with the virtual machine, an amount of storage consumed by a thin-provisioned file associated with the virtual machine, and an amount of storage consumed by the virtual disk associated with the virtual machine.

20. A method, comprising:
   receiving, at a storage system, an indication to perform an operation with respect to data associated with a specified granularity of storage associated with a virtual machine;
   identifying within a plurality of stored sets of meta information a stored set of meta information associated with the virtual machine, wherein the identified stored set of meta information associated with the virtual machine is maintained based at least in part on periodically querying a hypervisor, and wherein the identified stored set of meta information associated with the virtual machine indicates a type of guest operating system that is being run by the virtual machine, wherein the identified stored set of meta information associated with the virtual machine comprises statistical information associated with the virtual machine that includes at least one of a throughput and a cache hit ratio of the virtual machine;
   identifying the data associated with the specified granularity of storage associated with the virtual machine using the identified stored set of meta information;
   performing the operation with respect to at least a portion of the identified data associated with the specified granularity of storage associated with the virtual machine; and
   determining whether to update the identified stored set of meta information based at least in part on a result associated with the performed operation.

21. The method of claim 20, wherein the specified granularity of storage associated with the virtual machine includes one or more of the following: the virtual machine, a virtual disk associated with the virtual machine, a file associated with the virtual machine, a set of files associated with the virtual machine, a data object associated with the virtual machine, or a set of data objects associated with the virtual machine.

22. The method of claim 20, wherein the identified stored set of meta information comprises one or more policy settings associated with the virtual machine, wherein the one or more policy settings associated with the virtual machine comprise settings for one or more of the following: quality of service, resource quotas, replication, migration, reading data, and writing data.

23. The method of claim 20, further comprising:
   detecting a change made with respect to a configuration associated with the virtual machine; and
   updating the identified stored set of meta information based at least in part on the detected change.

24. The method of claim 23, wherein detecting the change with respect to the configuration associated with the virtual machine comprises one or more of the following: periodically querying the hypervisor, subscribing to messages sent out by the hypervisor, listening to the hypervisor, detecting file creation, detecting deletion or other activity at the hypervisor, and polling the hypervisor.

25. The method of claim 20, further comprising requesting additional or updated information from the hypervisor in response to receiving the indication to perform the operation.

26. The method of claim 25, further comprising updating the identified stored set of meta information based at least in part on the requested additional or updated information received from the hypervisor.

27. The method of claim 25, further comprising modifying an execution of the operation or a result of the operation based at least in part on the requested additional or updated information received from the hypervisor.

28. The method of claim 20, wherein the identified stored set of meta information comprises one or more attributes associated with the virtual machine, wherein the one or more attributes associated with the virtual machine include one or more of the following: what data is associated with the virtual machine, what data is associated with which virtual disk associated with the virtual machine, a unique virtual machine identifier associated with the virtual machine, a storage location of each virtual disk associated with the virtual machine, and whether the virtual machine is currently active.

29. A computer program product, the computer program product being embodied in a non-transitory computer readable storage medium and comprising computer instructions for:
    receiving, at a storage system, an indication to perform an operation with respect to data associated with a specified granularity of storage associated with a virtual machine;
    identifying within a plurality of stored sets of meta information a stored set of meta information associated with the virtual machine, wherein the identified stored set of meta information associated with the virtual machine is maintained based at least in part on periodically querying a hypervisor, and wherein the identified stored set of meta information associated with the virtual machine indicates a type of guest operating system that is being run by the virtual machine, wherein the identified stored set of meta information associated with the virtual machine comprises statistical information associated with the virtual machine that includes at least one of a throughput and a cache hit ratio of the virtual machine;
    identifying the data associated with the specified granularity of storage associated with the virtual machine using the identified stored set of meta information;
    performing the operation with respect to at least a portion of the identified data associated with the specified granularity of storage associated with the virtual machine; and
    determining whether to update the identified stored set of meta information based at least in part on a result associated with the performed operation.

* * * * *